US012736952B2

(12) United States Patent
Kim et al.

(10) Patent No.: US 12,736,952 B2
(45) Date of Patent: Sep. 15, 2026

(54) CALCULATION DEVICE AND METHOD FOR EXTRACTING FEATURE OF MEASUREMENT DATA BY USING SAME

(71) Applicant: RTM INC, Seoul (KR)

(72) Inventors: Sang Yeop Kim, Seoul (KR); Jin Woo Park, Seoul (KR)

(73) Assignee: RTM INC., Seoul (KR)

( * ) Notice: Subject to any disclaimer, the term of this patent is extended or adjusted under 35 U.S.C. 154(b) by 514 days.

(21) Appl. No.: 18/248,043

(22) PCT Filed: Feb. 24, 2022

(86) PCT No.: PCT/KR2022/095040

§ 371 (c)(1),
(2) Date: Apr. 5, 2023

(87) PCT Pub. No.: WO2022/240269

PCT Pub. Date: Nov. 17, 2022

(65) Prior Publication Data

US 2023/0384770 A1 Nov. 30, 2023

(30) Foreign Application Priority Data

May 13, 2021 (KR) ........................ 10-2021-0062133

(51) Int. Cl.
*G05B 19/418* (2006.01)

(52) U.S. Cl.
CPC .................... *G05B 19/4184* (2013.01); *G05B 2219/50065* (2013.01)

(58) Field of Classification Search
CPC .... G05B 2219/50065; G05B 19/41875; G05B 23/02; Y02P 90/02
See application file for complete search history.

(56) References Cited

U.S. PATENT DOCUMENTS 9,953,437 B1 4/2018 Kim et al.
2017/0252924 A1* 9/2017 Vijayanarasimhan ... G06N 3/08
2018/0336462 A1 11/2018 Brothers
2019/0067060 A1 2/2019 Plihal et al.
2020/0150634 A1* 5/2020 Gray ................ G05B 19/41835
2020/0160281 A1* 5/2020 Hou ....................... G06Q 10/00
(Continued)

FOREIGN PATENT DOCUMENTS

CN 111950575 A * 11/2020 ............. G06N 3/045
JP 2008212921 A * 9/2008
(Continued)

*Primary Examiner* — Santosh R Poudel
(74) *Attorney, Agent, or Firm* — Seed Intellectual Property Law Group LLP

(57) ABSTRACT

According to the present disclosure, a method of extracting a feature of measurement data using a computing apparatus may include identifying measurement data obtained during a process, identifying target data related to the measurement data, performing a computation on the measurement data based on the target data, extracting a plurality of first values by applying a max pooling layer to the computed measurement data, extracting a plurality of second values by applying a min pooling layer to the computed measurement data, and extracting a plurality of third values related to a feature of the measurement data using the plurality of first values and the plurality of second values.

20 Claims, 10 Drawing Sheets

(56) References Cited

U.S. PATENT DOCUMENTS

2020/0161083 A1 5/2020 Larson et al.
2020/0272946 A1 8/2020 Kim et al.
2020/0342287 A1 10/2020 Xu et al.
2021/0058667 A1* 2/2021 He ................... H04N 21/23418
2021/0253376 A1* 8/2021 Singhal .................... G06N 5/01
2022/0036136 A1* 2/2022 Muehlberg ........ G06F 18/24765
2024/0112023 A1* 4/2024 Vierck .................. G06N 3/044

FOREIGN PATENT DOCUMENTS

KR 20140015872 A 2/2014
KR 20180125884 A 11/2018
KR 20190035445 A 4/2019
KR 20200037869 A 4/2020
KR 20200057650 A 5/2020
KR 102114357 B1 6/2020
KR 20200105220 A 9/2020
KR 20210020976 A 2/2021
KR 102326006 B1 11/2021

* cited by examiner

CALCULATION DEVICE AND METHOD FOR EXTRACTING FEATURE OF MEASUREMENT DATA BY USING SAME

BACKGROUND

Technical Field

The present disclosure relates to a computing apparatus and a method for extracting a feature for measurement data using the same, and specifically, to technology for detecting an anomaly in a process by using a plurality of third values related to a feature of measurement data extracted based on a plurality of first values and a plurality of second values extracted by applying a pooling layer to measurement data having a one-dimensional or higher tensor structure.

Description of the Related Art

During a semiconductor manufacturing process, various substrate treatments such as deposition and etching of insulating films and metal materials may be performed, and whether a layer has been evenly formed to a desired thickness after the deposition and etching process may be an important criterion for confirming whether the goal of the process has been achieved. In addition, in the case of a coating process of applying a thin film on a substrate, whether the thin film has been evenly coated to a desired height may be an important criterion for confirming whether the goal of the process has been achieved.

In such various processes, it is important whether the thin film has been evenly formed to a predetermined height, and for this purpose, it may be evaluated whether there is an anomaly in the process using the height of the thin film measured by a sensor.

BRIEF SUMMARY

In the conventional technology, whether there is an anomaly in a process was evaluated using the entire measurement data. Some shortcomings with this approach are, when using the entire measurement data as such, it was possible to determine the exact upper and lower limit values at each position, but the efficiency of data management was deteriorated because the entire measurement data had to be used, and it was also difficult to predict the overall shape with respect to the height of the thin film from the measurement data.

According to another approach in the related art, whether there is an anomaly in a process was evaluated using statistical values such as the maximum value, minimum value, and average value of the entire measurement data. Some shortcomings with this approach are, when using statistical values of the entire measurement data as such, the efficiency of data management may be improved, but predicting the overall shape with respect to the height of the thin film was very limited, and it was difficult to deduce an exact position of measurement data deviating from the thresholds related to the upper and lower limits.

In addition, in other conventional technologies, a moving average was applied to measurement data corresponding to the heights of a thin film measured by a sensor to predict the average shape with respect to the height of the thin film, and accordingly, evaluate whether there is an anomaly in a process. However, application of a moving average, due to the nature of the moving average, is only able to represent the average shape with respect to the height of the thin film, but may not be able to accurately predict specific features related to the height of the thin film, and thus, there was always the probability of errors occurring when evaluating whether there is an anomaly in a process. As an example, if a moving average is applied in the case where the upper or lower limit value of measurement data is set as an important process target in a process for quality evaluation, the boundary line corresponding to the upper or lower limit value of the measurement data merely represents an approximate shape with respect to the height of the thin film, and relatively more deviations from the actual upper or lower limit value may occur, which made it difficult to accurately evaluate whether there is an anomaly in the process.

Therefore, when the upper or lower limit value of measurement data is set as an important process target, it is beneficial to improve the accuracy of process evaluation by extracting indicators of specific features of measurement data (e.g., the exact shape with respect to the height of the thin film) while minimizing or eliminating deviations from the actual measurement data.

The disclosed example embodiments show a technology for accurately evaluating a process by extracting specific features of measurement data. One or more embodiments of the present disclosure address the various shortcomings of the related art including the one identified above. However, the technical benefits achieved by the present disclosure are not limited to the technical aspects described above, and other benefits may be inferred from the following example embodiments.

According to a first example embodiment, there is provided a method of extracting a feature of measurement data using a computing apparatus, wherein the method may include identifying measurement data obtained during a process, identifying target data related to the measurement data, performing a computation on the measurement data based on the target data, extracting a plurality of first values by applying a max pooling layer to the computed measurement data, extracting a plurality of second values by applying a min pooling layer to the computed measurement data, and extracting a plurality of third values related to a feature of the measurement data using the plurality of first values and the plurality of second values.

According to an example embodiment, the extracting of a plurality of third values may include extracting based on a comparison between absolute values of the plurality of first values and the plurality of second values.

According to an example embodiment, the extracting of a plurality of third values may include extracting by selecting a value having a larger absolute value between the plurality of first values and the plurality of second values.

According to an example embodiment, the method may further include comparing the plurality of third values with a predetermined tolerance range, and identifying whether there is an anomaly in the measurement data obtained during the process based on the comparison result.

According to an example embodiment, the identifying of whether there is an anomaly may include identifying, when there is a value among the plurality of third values that is not included within the predetermined tolerance range, measurement data not included within the predetermined tolerance range, and providing related information.

According to an example embodiment, the plurality of first values may include a plurality of upper limit values for the computed measurement data determined based on the max pooling layer using predetermined parameters.

According to an example embodiment, the parameters may include at least one of a kernel size, a stride, and a number of poolings.

According to an example embodiment, the parameters may be predetermined according to the process.

According to an example embodiment, the measurement data may be an n-dimensional tensor, n being an integer equal to or greater than 1.

According to an example embodiment, the performing of a computation may include performing a subtraction computation between the measurement data and the target data.

According to an example embodiment, the plurality of second values may include a plurality of lower limit values for the computed measurement data determined based on the min pooling layer using predetermined parameters.

According to an example embodiment, the parameters may include at least one of a kernel size, a stride, and a number of poolings.

According to an example embodiment, the parameters may be predetermined according to the process.

According to an example embodiment, the first profile, a second profile, and a third profile may be composed of n-dimensional data, n being an integer equal to or greater than 1.

According to an example embodiment, the method may further include extracting a first profile by connecting the plurality of first values.

According to an example embodiment, the method may further include extracting a second profile by connecting the plurality of second values.

According to an example embodiment, the method may further include extracting a third profile by connecting the extracted plurality of third values.

According to an example embodiment, the kernel size may be greater than or equal to the stride, and a number of the plurality of first values may be adjusted based on the stride and the pooling number.

According to a second example embodiment, a computer-readable recording medium may include a non-transitory recording medium in which a program for executing the method described above in a computer is recorded.

According to a third example embodiment, a computing apparatus for extracting a feature of measurement data may include a memory in which a computer-readable instruction is stored, and a processor, wherein the processor connected to the memory is configured to identify the measurement data obtained during a process, identify target data related to the measurement data, perform a computation on the measurement data based on the target data, extract a plurality of first values by applying a max pooling layer to the computed measurement data, extract a plurality of second values by applying a min pooling layer to the computed measurement data, and extract a plurality of third values related to a feature of the measurement data using the plurality of first values and the plurality of second values.

Details of other example embodiments are included in the following detailed description and the accompanying drawings.

According to the present disclosure, a plurality of upper limit values may be extracted by applying a max pooling layer to measurement data, and a plurality of lower limit values may be extracted by applying a min pooling layer to measurement data. Here, whether there is an anomaly in a process may be accurately evaluated based on whether values having relatively larger absolute values among the plurality of upper limit values and the plurality of lower limit values are included within a predetermined tolerance range. Specifically, whether there is an anomaly in a process may be evaluated by comparing values having relatively larger absolute values among the plurality of upper limit values and the plurality of lower limit values with a predetermined tolerance range, and the reliability of a product manufactured through a subsequent process may be improved by providing information related to a region where an anomaly has occurred. In addition, by using a plurality of upper limit values and a plurality of lower limit values extracted by applying a max pooling layer and a min pooling layer to measurement data having a one-dimensional or higher tensor structure, not only may the efficiency of data management be improved, but the computational complexity may also be drastically reduced. Here, a first profile may be determined by connecting the plurality of upper limit values, a second profile may be determined by connecting the plurality of lower limit values, and a third profile may be determined by connecting values having relatively larger absolute values. The first profile and the second profile may represent boundary lines corresponding to upper and lower limit values of measurement data, and the third profile may correspond to a graph visualized to evaluate whether there is an anomaly in a process. By visualizing the exact shape of measurement data using the third profile, it is possible to easily visualize values deviating from a predetermined tolerance range.

The technical benefits of the present disclosure are not limited to those described above, and other benefits may be made apparent to those skilled in the art from the description of the claims.

DETAILED DESCRIPTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" or "comprising" another element, the element should not be understood as excluding other elements so long as there is no special conflicting description, and the element may include at least one other element.

The expression "at least one of A, B, and C" may include the following meaning: A alone; B alone; C alone; both A and B together; both A and C together; both B and C together; or all three of A, B, and C together.

The term "computing apparatus" mentioned below may be implemented as a computer or a portable terminal capable of accessing a server or another computing apparatus through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described in detail with reference to the accompanying drawings.

Figure 1:
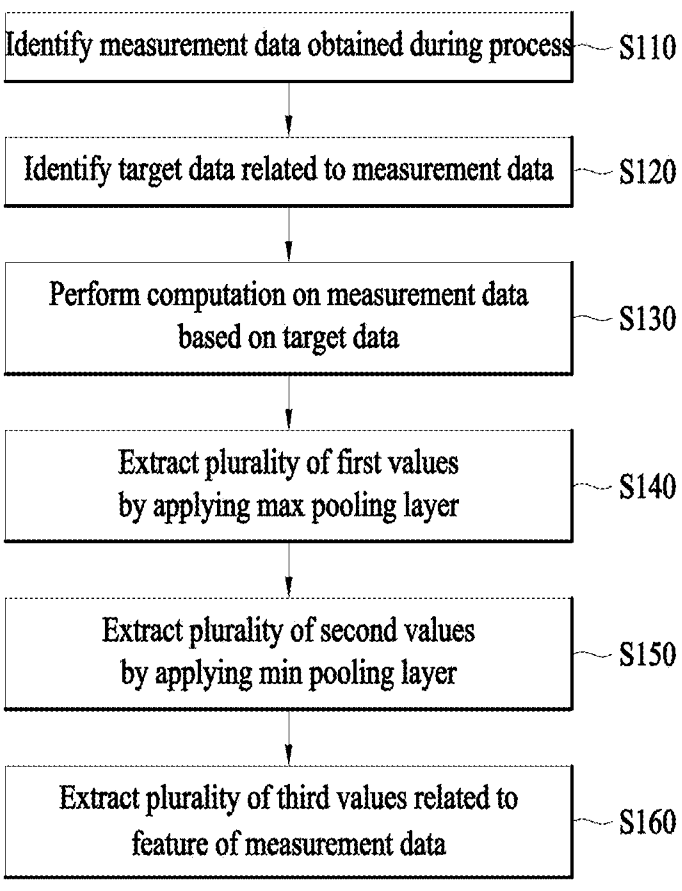
FIG. 1 is a flowchart illustrating a method of extracting a feature of measurement data according to an example embodiment.
Figure 2:
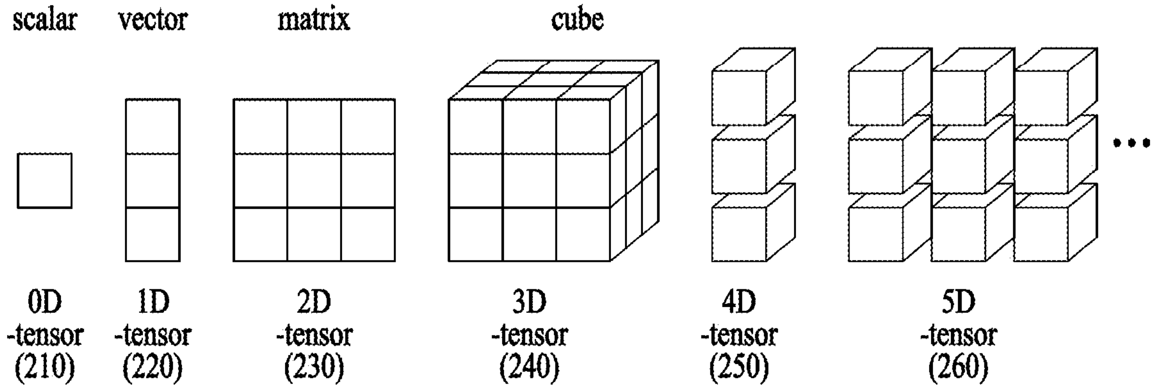
FIG. 2 is a diagram illustrating measurement data that is an n-dimensional tensor according to an example embodiment.

FIG. 1 is a flowchart illustrating a method of extracting a feature of measurement data according to an example embodiment. FIG. 2 is a diagram illustrating measurement data that is an n-dimensional tensor according to an example embodiment.

Referring to FIG. 1, a computing apparatus may identify measurement data obtained during a process in operation S110. Measurement data sensed using a plurality of sensors during the process may be obtained, and quality evaluation and defect evaluation related to the process may be performed based on the measurement data. As an example, if it is an important goal of a coating process to manufacture a coating with a uniform height (thickness), the coating height at each position of a substrate to be coated may be sensed using a plurality of sensors, and quality evaluation and defect evaluation of the coating process may be performed based on the sensed measurement data.

Here, measurement data may be measurement data having an n-dimensional tensor structure as shown in FIG. 2. A zero-dimensional tensor (0D-tensor) 210 may represent a single number as a scalar, a one-dimensional tensor (1D-tensor) 220 may be a vector with a magnitude and a direction composed of multiple scalars, a two-dimensional tensor (2D-tensor) 230 may be a matrix having rows and columns composed of a plurality of vectors, a three-dimensional tensor (3D-tensor) 240 may be a cube composed of a plurality of matrices, a four-dimensional tensor (4D-tensor) 250 may be composed of a plurality of 3D-tensors, and a five-dimensional tensor (5D-tensor) 260 may be composed of a plurality of 4D-tensors. Here, measurement data obtained during a process may be a one-dimensional or higher tensor. Compared to low-dimensional tensors, high-dimensional tensors are difficult to interpret in terms of evaluation (quality and defects) and are sensitive to noise, thus increasing computational complexity. Therefore, especially when measurement data is composed of high-dimensional tensors, a technology for extracting main features of the measurement data and facilitate evaluation is further needed.

Hereinafter, with the case of a process of coating a substrate or a film, such as a wafer deposition process, as an example, an explanation will be provided assuming that measurement data is composed of a one-dimensional tensor. Here, as an example, the x-axis may correspond to each position on the wafer, and the y-axis may correspond to the height of the thin film after deposition.

In operation S120, the computing apparatus may identify target data related to the measurement data. Target data corresponding to an ideal goal to be achieved through a process may be determined in advance, and the computing apparatus may identify selected (or predetermined) target data related to each measurement data. As an example, in the case of a coating process, an ideal coating height of a thin film may be selected (or predetermined) as target data, and the computing apparatus may identify selected (or predetermined) target data corresponding to the coating height, which is the measurement data obtained through a sensor in the coating process. Specifically, when the goal is to evenly apply a coating so that the coating height corresponds to X nanometers (nm) in the coating process, the computing apparatus may identify the target data of X nm selected (or predetermined) in the coating process.

In operation S130, the computing apparatus may perform a computation on the measurement data based on the target data. As an example, the computing apparatus may perform a subtraction computation between the measurement data and the target data. As an example, in the case of coating a substrate or film, such as a wafer deposition process, the coating height at each position on the wafer, that is, at each point on the x-axis, is obtained as measurement data through a sensor, and the difference between the target coating height and the actual coating height at each position may be identified through a subtraction computation between the measurement data and selected (or predetermined) target data. As an example, if the result of computation is less than 0, it may correspond to the case where the actual coating height is smaller than the target coating height, if the result of computation is greater than 0, it may correspond to the case where the actual coating height is greater than the target coating height, and if the result of computation is 0, it may correspond to the case where the actual coating height and the target coating height are the same. A detailed description in this regard will be provided with reference to FIG. 3.

In operation S140, the computing apparatus may extract a plurality of first values by applying a max pooling layer to the computed measurement data. A plurality of first values corresponding to a plurality of upper limit values may be extracted by applying a max pooling layer using selected (or predetermined) parameters to the measurement data computed in operation S130, and a first profile corresponding to upper limit values of the measurement data may be created by connecting the plurality of first values. The first profile is a graph corresponding to the boundary line of upper limit values of the measurement data, and features of the measurement data may be more easily visually found using the first profile. As an example, when 980 pieces of measurement data are obtained through a coating process, 37 upper limit values may be extracted by applying a max pooling layer corresponding to certain conditions. Here, the 37 upper limit values may be smaller than or equal to the maximum value of the measurement data at each position on the wafer. In addition, a first profile corresponding to upper limit values of the measurement data may be extracted by connecting the 37 upper limit values. Here, the first profile is a graph corresponding to a boundary line of the upper limit values of the measurement data at each position, and features of the upper limit values of the coating height at each position on the wafer may be easily visually found based on the first profile rather than the plurality of first values. A detailed description in this regard will be provided with reference to FIG. 4.

In operation S150, the computing apparatus may extract a plurality of second values by applying a min pooling layer to the computed measurement data. A plurality of second values corresponding to a plurality of lower limit values may be extracted by applying a min pooling layer using selected (or predetermined) parameters to the measurement data computed in operation S130, and a second profile corresponding to the lower limit values of the measurement data may be created by connecting the plurality of second values. The second profile is a graph corresponding to the boundary line of the lower limit values of the measurement data, and features of the measurement data may be more easily visually found using the second profile. As an example, when 980 pieces of measurement data are obtained through a coating process, 37 lower limit values may be extracted by applying a min pooling layer corresponding to certain conditions. Here, the 37 lower limit values may be greater than or equal to the minimum values of the measurement data at each position on the wafer. In addition, a second profile corresponding to the lower limit values of the measurement data may be created by connecting the 37 lower limit values. Here, the second profile is a graph corresponding to a boundary line of the lower limit values of the measurement data at each position, and features of the lower limit values of the coating height at each position on the wafer may be easily visually found using the second profile. A detailed description in this regard will be provided with reference to FIG. 5.

In operation S160, the computing apparatus may extract a plurality of third values related to features of the measurement data using the plurality of first values and the plurality of second values. Specifically, a plurality of third values may be extracted based on a comparison of absolute values between the plurality of first values and the plurality of second values. More specifically, a plurality of third values may be extracted by comparing absolute values of the first values and the second values at each position on the wafer, that is, at each point on the x-axis, and then selecting a value having a larger absolute value. A detailed description in this regard will be provided with reference to FIG. 7.

Here, a third profile may be created by connecting the plurality of third values. The third profile may correspond to a part of the boundary line related to the upper limit values and a part of the boundary line related to the lower limit values of the measurement data, and features of the measurement data may be more easily visually found using the third profile.

In addition, the computing apparatus may compare the plurality of third values with a selected (or predetermined) tolerance range and identify a position on the wafer where an anomaly has occurred during the process. Specifically, when the plurality of third values are within a selected (or predetermined) tolerance range, the computing apparatus may confirm that no anomaly has occurred during the process. However, if there is a value among the plurality of third values that is not included within the selected (or predetermined) tolerance range, that is, if there is a value deviating from the tolerance range, the computing apparatus may confirm that an anomaly has occurred during the process, identify information related to the section corresponding to the value deviating from the tolerance range, and check the position on the wafer where the anomaly has occurred during the process. As an example, if there is a value among a plurality of third values obtained through a coating process that is not within a selected (or predetermined) tolerance range, the computing apparatus may confirm that the wafer has not been coated to have a uniform height belonging to the selected (or predetermined) tolerance range, and check the position corresponding to the value deviating from the tolerance range.

Figure 3:
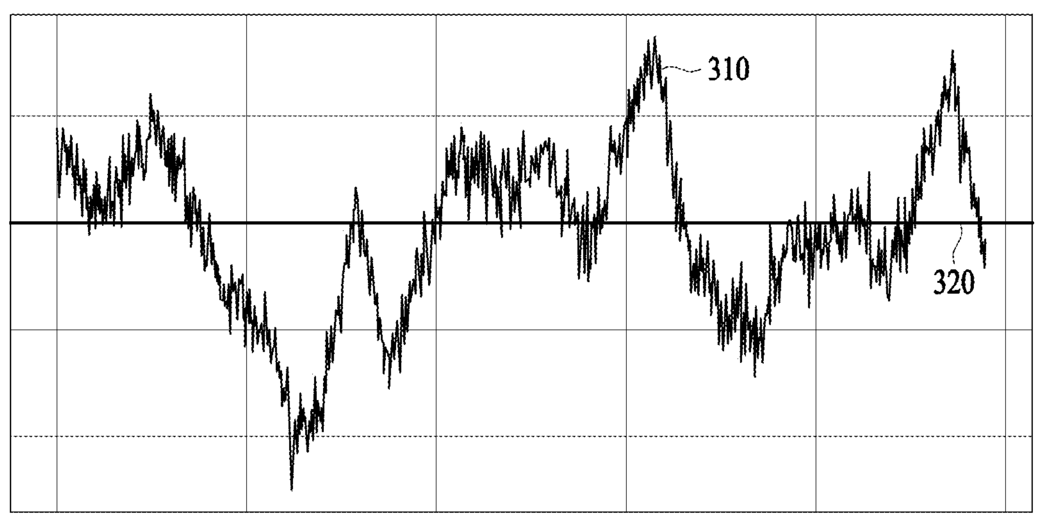
FIG. 3 illustrates performance of a computation on measurement data based on target data according to an example embodiment.

FIG. 3 illustrates performance of a computation on measurement data based on target data according to an example embodiment. Referring to FIG. 3, measurement data may correspond to a graph 310 and target data may correspond to a graph 320. Here, in the case of a wafer deposition process, assuming that measurement data is composed of a one-dimensional tensor, the x-axis may correspond to each position on the wafer, and the y-axis may correspond to the height of a thin film after deposition. The measurement data may be data obtained through a sensor during the process, and the target data may be data corresponding to a selected (or predetermined) target in relation to the process. As an example, in a wafer deposition process of depositing a thin film to a uniform height, the target data may be data corresponding to a selected (or predetermined) height in relation to the deposition process. Here, if the measurement data computed by subtracting the target data 320 from the measurement data 310 is greater than 0, it may be the case where the height of the thin film after deposition is higher than the desired target data, if the computed measurement data is less than 0, it may be the case where the height of the thin film after deposition is smaller than the desired target data, and if the computed measurement data is 0, it may be the case where the height of the thin film after deposition is the same as the desired target data. The closer measurement data is to target data, the greater the reliability of a product produced through a process, and the further the measurement data is from the target data, the lower the reliability of a product manufactured through the process.

The computing apparatus may perform a computation of subtracting the target data 320 from the measurement data 310, and measurement data 410, 510, 610, and 710 shown in FIGS. 4 to 7 may correspond to data obtained by subtracting the target data 320 from the measurement data 310.

Figure 4:
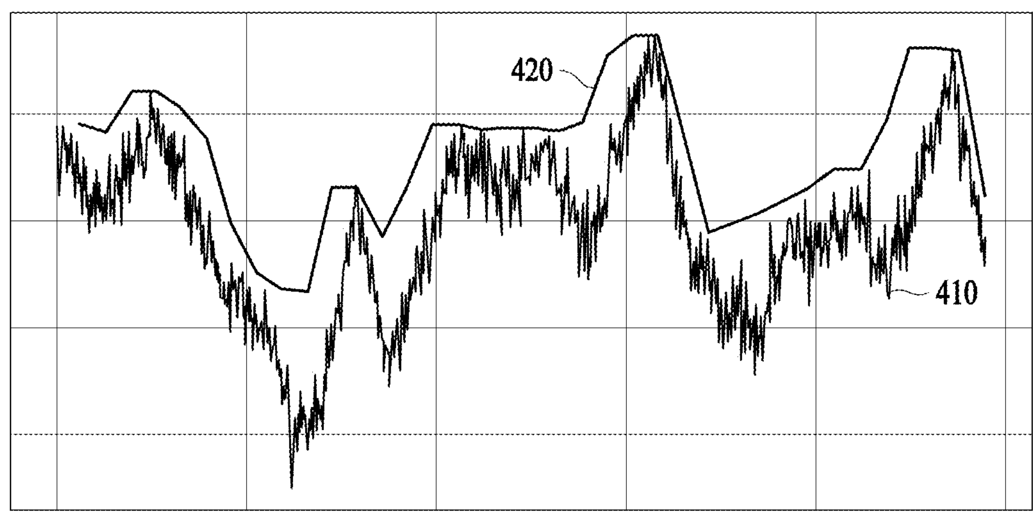
FIG. 4 illustrates a process of extracting a first profile by applying a max pooling layer to measurement data according to an example embodiment.

FIG. 4 illustrates a process of extracting a first profile by applying a max pooling layer to measurement data according to an example embodiment. Referring to FIG. 4, measurement data may correspond to a graph 410 and a first profile may correspond to a graph 420.

A plurality of first values corresponding to a plurality of upper limit values may be extracted by applying a max pooling layer using selected (or predetermined) parameters to the measurement data 410, and the first profile 420 corresponding to the upper limit values of the measurement data 410 may be extracted by connecting the plurality of first values. That is, by connecting the plurality of first values, the first profile 420 corresponding to the boundary line indicating the upper limit values of the measurement data 410 may be extracted. Features of the upper limit values of the measurement data may be easily visually found based on the first profile rather than the plurality of first values.

Here, the selected (or predetermined) parameters may include at least one of a kernel size, a stride, and a number of poolings. As an example, if the number of poolings is 3, a max pooling layer 1 may be set with a kernel size of 7*7 and a stride of 3, a max pooling layer 2 may be set with a kernel size of 5*5 and a stride of 3, and a max pooling layer 3 may be set with a kernel size of 5*5 and a stride of 3. Specifically, the max pooling layer 2 having the kernel size of 5*5 and the stride of 3 may be applied to the measurement data 410 to extract upper limit values from a target region of the measurement data. As an example, 37 upper limit values may be extracted by applying a max pooling layer to 980 pieces of the measurement data 410, and the first profile 420 corresponding to the upper limit values of the measurement data may be extracted by connecting the 37 upper limit values.

In addition, parameters may be selected (or predetermined) in consideration of characteristics of each process. Specifically, a kernel size, a stride, and a pooling number may be determined differently for each process in consideration of the nature of the process, and may be determined in advance. Here, the kernel size does not affect the number of the plurality of first values, but may affect the range covered by each first value. Specifically, when the kernel size is 7*7, not 5*5, the range covered by each of the extracted first values may be relatively broad, given the properties of the kernel size. Moreover, unlike the kernel size, the stride and the pooling number may affect the number of the plurality of first values, given the properties of the stride and the pooling number. Specifically, when the stride increases or the pooling number increases, the number of the plurality of first values may be smaller than 37. Here, when the pooling number (that is, the number of pooling layers) is plural, kernels having the same stride and kernel size may be used in the plurality of poolings, or kernels having different strides and kernel sizes may be used. Here, if the kernel size is greater than or equal to the stride, a filter may be applied to all measurement data, and if the kernel size is smaller than the stride, a filter may not be applied to part of the measurement data. Therefore, in the present disclosure, it is assumed that the kernel size is greater than or equal to the stride.

The max pooling layer may be determined based on measurement data that is an n-dimensional tensor. As an example, a max pooling layer applied to measurement data having a 1D tensor structure may be a 1D max pooling layer, and a max pooling layer applied to measurement data having a 2D tensor structure may be a 2D max pooling layer.

Figure 5:
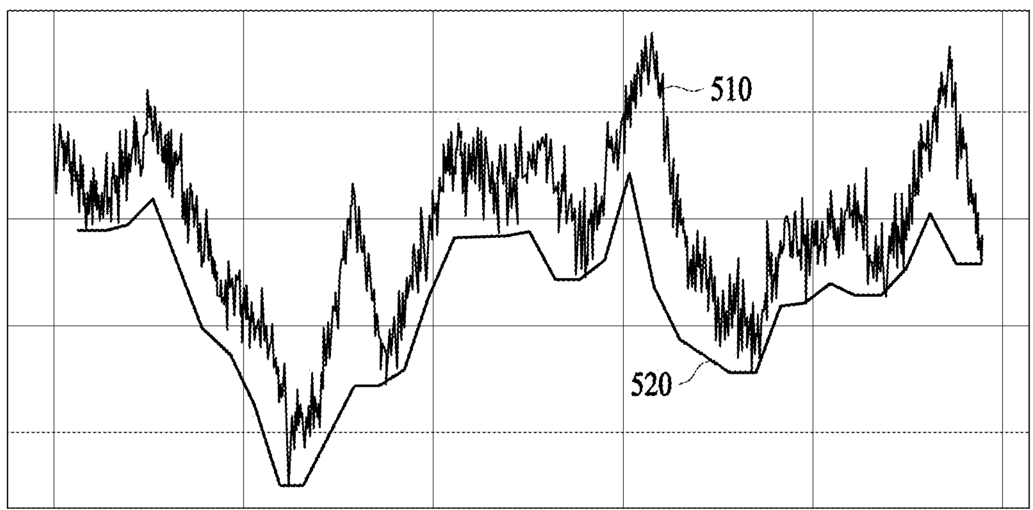
FIG. 5 illustrates a process of extracting a second profile by applying a min pooling layer to measurement data according to an example embodiment.

FIG. 5 illustrates a process of extracting a second profile by applying a min pooling layer to measurement data according to an example embodiment. Referring to FIG. 5, measurement data may correspond to a graph 510 and a second profile may correspond to a graph 520.

A plurality of second values corresponding to a plurality of lower limit values may be extracted by applying a min pooling layer using selected (or predetermined) parameters to the measurement data 510, and the second profile 520 corresponding to lower limit values of the measurement data 510 may be created by connecting the plurality of second values. That is, when connecting the plurality of second values, the second profile 520 corresponding to the boundary line indicating the lower limit values of the measurement data 510 may be created. The features of the lower limit values of the measurement data may be easily visually found based on the second profile rather than the plurality of second values.

Here, the selected (or predetermined) parameters may include at least one of a kernel size, a stride, and a number of poolings. As an example, if the number of poolings is 3, a min pooling layer 1 may be set with a kernel size of 7*7 and a stride of 3, a min pooling layer 2 may be set with a kernel size of 5*5 and a stride of 3, and a min pooling layer 3 may be set with a kernel size of 5*5 and a stride of 3. Specifically, min pooling layer 2 in accordance with a kernel size of 5*5 and a stride of 3 may be applied to the measurement data 510 and lower limit values may be extracted from a target region of the measurement data. As an example, 37 lower limit values may be extracted by applying a min pooling layer to 980 pieces of the measurement data 510, and the second profile 520 corresponding to the lower limit values of the measurement data may be extracted by selecting and connecting the 37 lower limit values.

In addition, parameters may be selected (or predetermined) in consideration of characteristics of each process. Specifically, a kernel size, a stride, and a pooling number may be determined differently for each process in consideration of the nature of the process, and may be determined in advance. Here, the kernel size does not affect the number of the plurality of second values, but may affect the range covered by each second value. Specifically, when the kernel size is 7*7, not 5*5, the range covered by each of the extracted second values may be relatively broad, given the properties of the kernel size. Moreover, unlike the kernel size, the stride and the pooling number may affect the number of the plurality of second values, given the properties of the stride and the pooling number. Specifically, when the stride increases or the pooling number increases, the number of the plurality of second values may be smaller than 37. Here, when the pooling number is plural, kernels having the same stride and kernel size may be used in the plurality of poolings, or kernels having different strides and kernel sizes may be used. Here, if the kernel size is greater than or equal to the stride, a filter may be applied to all measurement data, and if the kernel size is smaller than the stride, the filter may not be applied to part of the measurement data. Therefore, in the present disclosure, it is assumed that the kernel size is greater than or equal to the stride.

The min pooling layer may be determined based on measurement data that is an n-dimensional tensor. As an example, a min pooling layer applied to measurement data having a 1D tensor structure may be a 1D min pooling layer, and a min pooling layer applied to measurement data having a 2D tensor structure may be a 2D min pooling layer.

Figure 6:
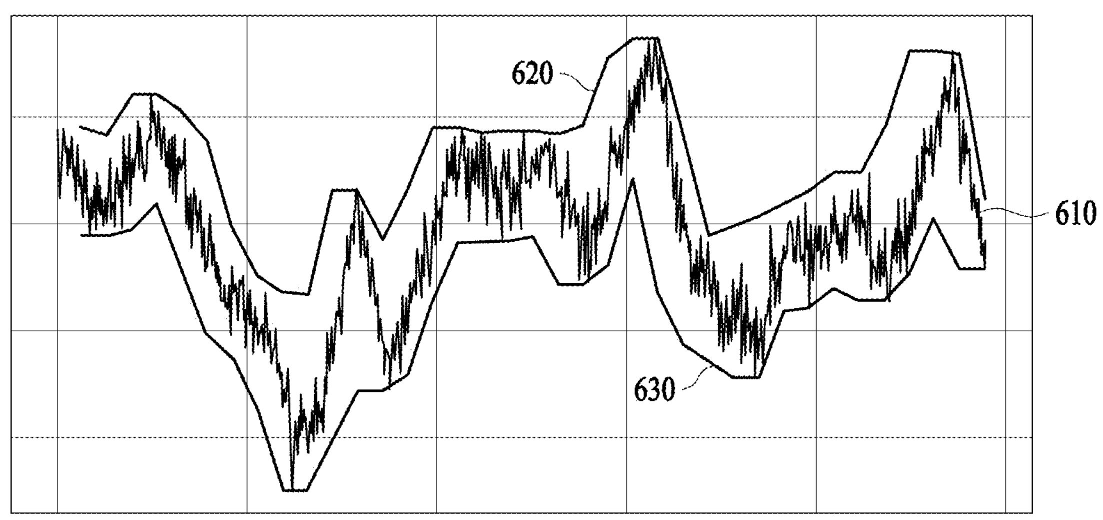
FIG. 6 illustrates measurement data, a first profile, and a second profile according to an example embodiment.

FIG. 6 illustrates measurement data, a first profile, and a second profile according to an example embodiment. Referring to FIG. 6, measurement data may correspond to a graph 610, a first profile may correspond to a graph 620, and a second profile may correspond to a graph 630. The descriptions described above in relation to the first profile and the second profile may be applied.

Figure 7:
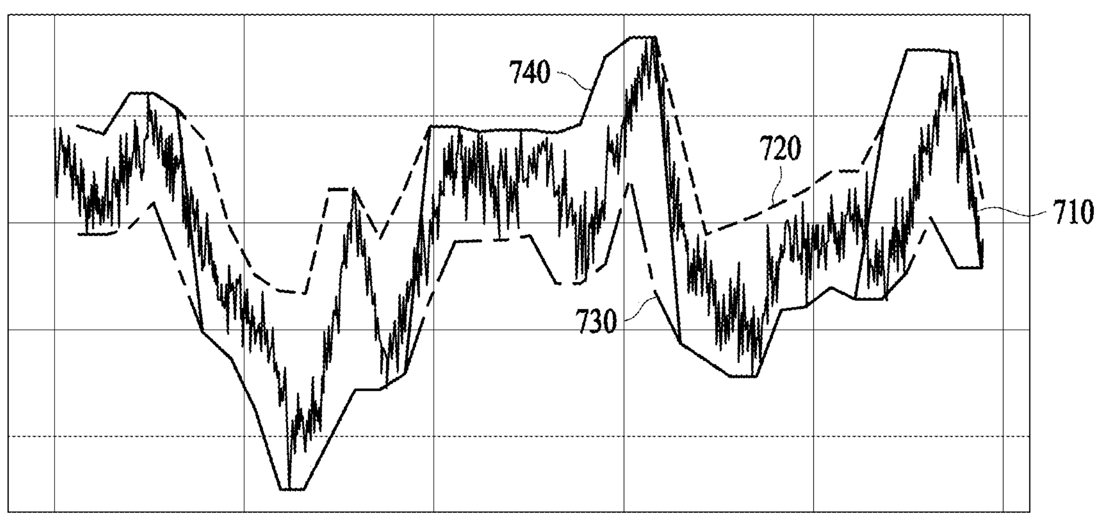
FIG. 7 illustrates a relationship among a first profile, a second profile, and a third profile according to an example embodiment.

FIG. 7 illustrates a relationship among a first profile, a second profile, and a third profile according to an example embodiment. Referring to FIG. 7, measurement data may correspond to a graph 710, a first profile may correspond to a graph 720, a second profile may correspond to a graph 730, and a third profile may correspond to a graph 740. Here, the first profile 720, the second profile 730, and the third profile 740 may be composed of n-dimensional tensors (n being an integer equal to or greater than 1) corresponding to the measurement data 710 having an n-dimensional tensor (n being an integer equal to or greater than 1) structure.

As described above, the first profile 720 connecting a plurality of first values extracted by applying a max pooling layer may indicate a boundary line corresponding to the upper limit values of the measurement data 710, and the second profile 730 connecting a plurality of second values extracted by applying a min pooling layer may indicate a boundary line corresponding to the lower limit values of the measurement data 710.

As a result of a subtraction computation between the measurement data 310 and the target data 320 described in FIG. 3, the measurement data 710, the first profile 720, and the second profile 730 may have a region having a result value of 0 or more or less than 0.

A plurality of third values may be extracted based on a comparison between absolute values of the plurality of first values and the plurality of second values, and the third profile 740 may be created by connecting the plurality of third values. As an example, 37 multiple third values may be extracted by comparing the absolute values of the first value and the second value at each point on the same x-axis on a wafer and then selecting a value having a relatively larger absolute value. As an example, 37 third values including values having relatively larger absolute values among 37 first values and 37 second values may be extracted without using 980 pieces of measurement data.

The third profile 740 may be created by connecting the 37 multiple third values extracted as such. The third profile 740 may correspond to a part of the boundary line related to the upper limit values and a part of the boundary line related to the lower limit values of the measurement data. The third profile 740 is a boundary line representing features corresponding to the upper and lower limits of the measurement data, and features of the measurement data 710 may be easily visually found using the third profile 740.

Figure 8:
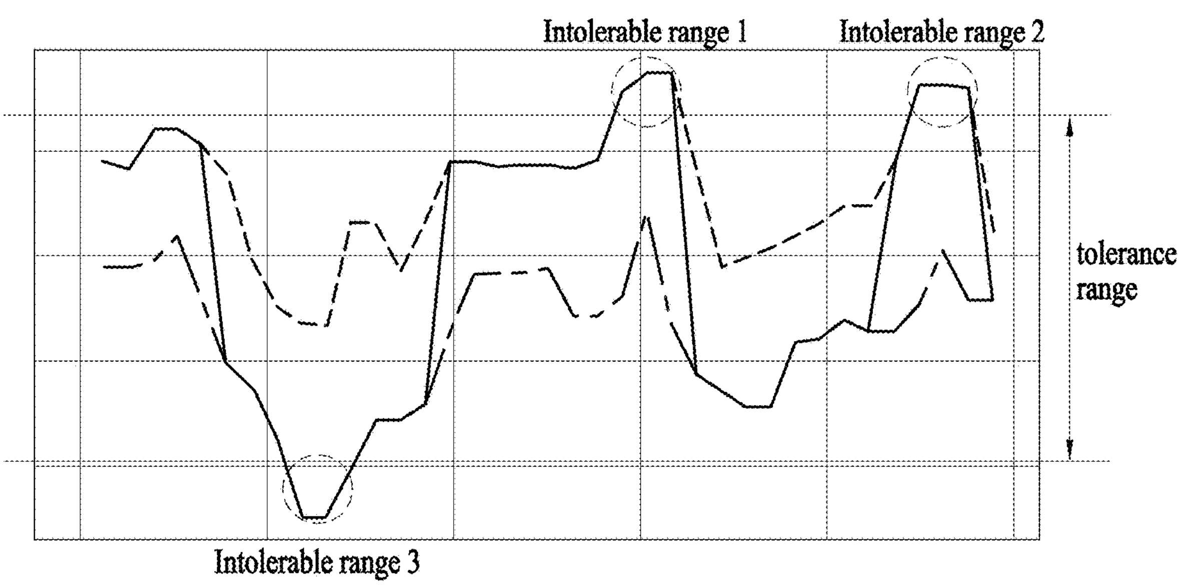
FIG. 8 visually illustrates detection of an anomaly occurring in a process using a third profile according to an example embodiment.

FIG. 8 visually illustrates detection of an anomaly occurring in a process using a third profile according to an example embodiment. The computing apparatus may compare the plurality of third values extracted through the aforementioned process with a selected (or predetermined) tolerance range. Here, the selected (or predetermined) tolerance range may be different for each process. If the plurality of third values are included within the tolerance range, the computing apparatus may confirm that the process for the corresponding region has proceeded normally. Alternatively, if there is a value among the plurality of third values that is not included within the tolerance range, the computing apparatus may detect that the process has proceeded abnormally and an anomaly has occurred, and identify information related to the section corresponding to the value deviating from the tolerance range to check the position on the wafer where the anomaly occurred during the process. As an example, when there are Value 1, Value 2, and Value 3 among a plurality of third values related to a coating process that are not included within a selected (or predetermined) tolerance range, the computing apparatus may identify Intolerable Range 1 corresponding to Value 1, Intolerable Range 2 corresponding to Value 2, and Intolerable Range 3 corresponding to Value 3, and the computing apparatus may detect that an anomaly has occurred during the process in the regions corresponding to Intolerable Range 1, Intolerable Range 2, and Intolerable Range 3. According to the results of detection, the computing apparatus may provide information indicating inspection of the process related to regions corresponding to Intolerable Range 1, Intolerable Range 2, and Intolerable Range 3. Thereafter, the plurality of third values may be included within a selected (or predetermined) tolerance range even in the corresponding regions, and the reliability of a product produced through the process may be improved.

Figure 9:
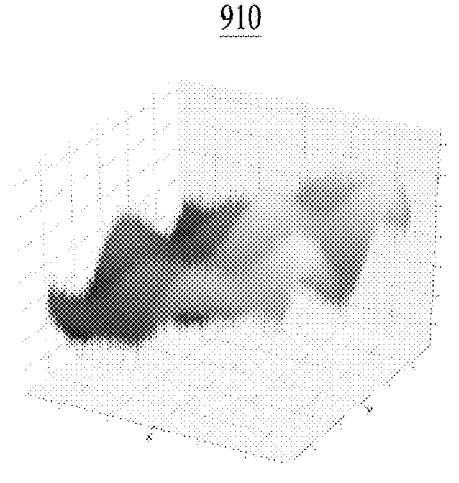
FIG. 9 illustrates extracting of a profile for measurement data having a two-dimensional tensor structure according to an example embodiment.
Figure 9:
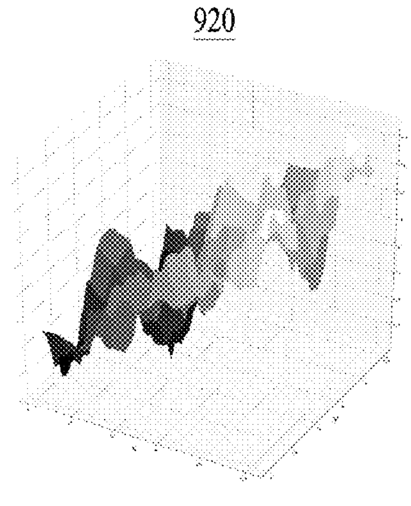

FIG. 9 illustrates extracting of a profile for measurement data having a two-dimensional tensor structure according to an example embodiment. Referring to FIG. 9, an image 910 indicates measurement data obtained during a process, and an image 920 indicates a profile extracted for the measurement data. A process of extracting a profile for measurement data having a one-dimensional tensor structure may be similarly applied. That is, a process of extracting a profile for measurement data having an n-dimensional tensor structure may be applied in the same manner.

Figure 10:
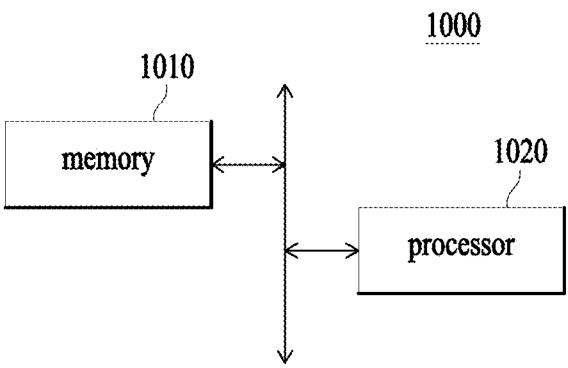
FIG. 10 is a functional block diagram of a computing apparatus for extracting a feature of measurement data according to an example embodiment.

FIG. 10 is a functional block diagram of a computing apparatus for extracting features of measurement data according to an example embodiment. Components related to the example embodiment are illustrated in FIG. 10, but are not limited thereto, and other general-purpose components may be further included in addition to the components illustrated in FIG. 10.

A computing apparatus 1000 may include a memory 1010 and a processor 1020. Each element illustrated in FIG. 10 indicates a unit that processes at least one function or operation, and may be implemented as hardware or software, or a combination of hardware and software.

According to an example embodiment, the computing apparatus 1000 of FIG. 10 may be implemented as a server, a computer, or a terminal, and the present disclosure is not limited by an implementation method of the computing apparatus 1000.

The memory 1010 may store various data related to the computing apparatus 1000. As an example, the memory 1010 may store at least one instruction for operating the computing apparatus 1000. In this case, the processor 1020 to be described below may perform various operations based on instructions stored in the memory 1010. As another example, the memory 1010 may store information related to measurement data, target data, and each profile in relation to the operation of the computing apparatus 1000. In this case, the processor 1020 may perform an operation using information stored in the memory 1010. However, information stored in the memory 1010 is not limited to the above examples, and various types of information may be stored in the memory 1010.

The processor 1020 may control overall operations of the computing apparatus 1000. As an example, the processor 1020 may control the operation of the computing apparatus 1000 by controlling elements of the computing apparatus 1000 based on instructions stored in the memory 1010.

The processor 1020 may be composed of one or more cores, and may include a processor for analyzing data and deep learning, such as a Central Processing Unit (CPU), a General Purpose Graphics Processing Unit (GPGPU), and a Tensor Processing Unit (TPU) of a computing apparatus 1000. The processor 1020 may extract features of measurement data according to an example embodiment of the present disclosure by reading a computer program stored in the memory 1010. According to an example embodiment of the present disclosure, the processor 1020 may perform a computation for applying a pooling layer. The processor 1020 may perform a computation related to a neural network, such as processing of input data in Deep Learning (DL), extraction of a feature from input data, error calculation, and update of a weighted value of a neural network by using backpropagation. In addition, in an example embodiment of the present disclosure, features of measurement data may be extracted by using a plurality of processors together. In an example embodiment of the present disclosure, the measurement data is not limited to data related to a coating process and a semiconductor process, and may include all types of data obtained in an industrial field.

The present example embodiments may be represented by functional blocks and various processing steps. These functional blocks may be implemented by various numbers of hardware and/or software configurations that execute specific functions. For example, the present embodiments may adopt integrated circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, assembler and Python including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism," "element," "means," and "configuration" may be widely used and are not limited to mechanical and physical components. These terms may include meaning of a series of routines of software in association with a processor, for example.

The above-described example embodiments are merely examples and other embodiments may be implemented within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of extracting a feature of measurement data using a computing apparatus, the method comprising:

identifying the measurement data obtained during a process of coating a substrate of a semiconductor;

identifying target data related to the measurement data, the target data indicating a selected coating height;

performing a computation on the measurement data based on the target data;

extracting a plurality of first values by applying a max pooling layer to the computed measurement data;

extracting a plurality of second values by applying a min pooling layer to the computed measurement data;

extracting a plurality of third values related to a feature of the measurement data using the plurality of first values and the plurality of second values;

identifying an anomaly that occurred during the process based on the plurality of third values;

providing information for inspection of the process based on a region where the anomaly was identified; and manufacturing the substrate of the semiconductor such that the coating has a uniform height at each position of the substrate based on the provided information for inspection.

2. The method of claim 1, wherein the extracting of a plurality of third values comprises extracting based on a comparison between absolute values of the plurality of first values and the plurality of second values.

3. The method of claim 2, wherein the extracting of a plurality of third values comprises extracting by selecting a value having a larger absolute value between the plurality of first values and the plurality of second values.

4. The method of claim 3, further comprising creating a third profile by connecting the extracted plurality of third values.

5. The method of claim 1, further comprising:

comparing the plurality of third values with a selected tolerance range; and identifying whether there is an anomaly in the measurement data obtained during the process based on the comparison result.

6. The method of claim 5, wherein the identifying of whether there is an anomaly comprises:

identifying, when there is a value among the plurality of third values that is not included within the selected tolerance range, measurement data not included within the selected tolerance range, and providing related information.

7. The method of claim 1, wherein the plurality of first values includes a plurality of upper limit values for the computed measurement data determined based on the max pooling layer using selected parameters.

8. The method of claim 7, wherein the parameters include at least one of a kernel size, a stride, and a number of poolings.

9. The method of claim 8, wherein the kernel size is greater than or equal to the stride, and wherein a number of the plurality of first values is adjusted based on the stride and the pooling number.

10. The method of claim 7, wherein the parameters are selected according to the process.

11. The method of claim 7, further comprising creating a first profile by connecting the plurality of first values.

12. The method of claim 1, wherein the measurement data is an n-dimensional tensor, n being an integer equal to or greater than 1.

13. The method of claim 12, wherein the first profile, a second profile, and a third profile are composed of n-dimensional data, n being an integer equal to or greater than 1.

14. The method of claim 1, wherein the performing of a computation comprises performing a subtraction computation between the measurement data and the target data.

15. The method of claim 1, wherein the plurality of second values includes a plurality of lower limit values for the computed measurement data determined based on the min pooling layer using selected parameters.

16. The method of claim 15, wherein the parameters include at least one of a kernel size, a stride, and a number of poolings.

17. The method of claim 15, wherein the parameters are selected according to the process.

18. The method of claim 15, further comprising creating a second profile by connecting the plurality of second values.

19. A non-transitory computer-readable recording medium having contents configured to cause a computing system to perform a method, the method comprising:

identifying measurement data obtained during a process of coating a substrate;

identifying target data related to the measurement data, the target data indicating a selected coating height;

performing a computation on the measurement data based on the target data;

extracting a plurality of first values by applying a max pooling layer to the computed measurement data;

extracting a plurality of second values by applying a min pooling layer to the computed measurement data;

extracting a plurality of third values related to a feature of the measurement data using the plurality of first values and the plurality of second values;

identifying an anomaly that occurred during the process based on the plurality of third values;

providing information for inspection of the process based on a region where the anomaly was identified; and manufacturing the substrate of the semiconductor such that the coating has a uniform height at each position of the substrate based on the provided information for inspection.

20. A computing apparatus for extracting a feature of measurement data, the computing apparatus comprising:

a memory in which a computer-readable instruction is stored; and a processor connected to the memory, wherein the processor is configured to:

identify the measurement data obtained during a process for applying a substrate treatment to a semiconductor, wherein the process for applying the substrate treatment to the semiconductor includes the process of coating a substrate of the semiconductor;

identify target data related to the measurement data, the target data including a selected coating height;

perform a computation on the measurement data based on the target data;

extract a plurality of first values by applying a max pooling layer to the computed measurement data;

extract a plurality of second values by applying a min pooling layer to the computed measurement data;

extract a plurality of third values related to a feature of the measurement data using the plurality of first values and the plurality of second values;

identify an anomaly that occurred during the process based on the plurality of third values;

provide information for inspection of the process based on a region where the anomaly was identified; and manufacture the substrate of the semiconductor such that the coating has a uniform height at each position of the substrate of the semiconductor based on the provided information for inspection.

* * * * *